(12) United States Patent
Al-Jadani

(10) Patent No.: US 7,684,284 B1
(45) Date of Patent: Mar. 23, 2010

(54) STEERING AND FIXED ANGLE GEOPHONE

(75) Inventor: Mohammad Abdul-Ghani Al-Jadani, Jeddah (SA)

(73) Assignee: Saudi Arabian Oil Company (SA)

( * ) Notice: Subject to any disclaimer, the term of this patent is extended or adjusted under 35 U.S.C. 154(b) by 0 days.

(21) Appl. No.: 12/396,551

(22) Filed: Mar. 3, 2009

(51) Int. Cl.
*G01V 1/18* (2006.01)

(52) U.S. Cl. .................. 367/178; 367/188; 181/122; 181/401

(58) Field of Classification Search .................. 367/178, 367/182, 185, 188; 181/122, 401
See application file for complete search history.

(56) References Cited

U.S. PATENT DOCUMENTS

| | | |
|---|---|---|
| 3,766,519 A | 10/1973 | Stephenson |
| 4,292,679 A | 9/1981 | Kondo et al. |
| 4,300,220 A | 11/1981 | Goff et al. |
| 4,525,819 A | 6/1985 | Hefer |
| 4,597,070 A * | 6/1986 | Redeker ............... 367/185 |
| 4,813,029 A | 3/1989 | Erich, Jr. et al. |
| 4,838,379 A | 6/1989 | Maxwell |
| 5,007,031 A * | 4/1991 | Erich, Jr. ............... 367/188 |
| 5,214,614 A | 5/1993 | Baule |
| 5,253,223 A * | 10/1993 | Svenning et al. ........... 367/178 |
| 5,335,208 A | 8/1994 | Sansone |
| 5,475,652 A | 12/1995 | McNeel et al. |
| 6,205,403 B1 | 3/2001 | Gaiser et al. |
| 6,366,537 B1 | 4/2002 | Sambuelli et al. |
| 6,412,592 B1 | 7/2002 | Meynier |
| 6,553,315 B2 | 4/2003 | Kerekes et al. |

FOREIGN PATENT DOCUMENTS

JP 56007590 A 1/1981

* cited by examiner

*Primary Examiner*—Ian J Lobo
(74) *Attorney, Agent, or Firm*—Bracewell & Giuliani LLP

(57) ABSTRACT

The current invention minimizes the energy losses by pointing the geophone's internal system, which consists of a magnet bar, coil, and springs, towards signals reflected from targets.

8 Claims, 2 Drawing Sheets

STEERING AND FIXED ANGLE GEOPHONE

TECHNICAL FIELD OF THE INVENTION

The present invention relates generally to the field of seismic sensors and, more particularly, to a geophone with an internal system that may be directionally adjusted.

BACKGROUND OF THE INVENTION

Seismic data acquisition is one of the geophysical tools used to image and characterize the earth's subsurface geological features. The data being acquired can be used to define regional or local geological structures and provide some detailed geological descriptions, making seismic data acquisition a widely used tool in hydrocarbon exploration and exploitation.

Seismic data acquisition uses sound source waves either generated at the surface, such as seismic vibrators or weight drops, or generated at some depth, such as with dynamite. These sound waves can be divided into 3 major categories, primary, secondary (shear), and surface waves. Hydrocarbon exploration generally utilises either primary or secondary waves. After being generated, primary and secondary waves propagate into subsurface geological layers and at the geological layers boundaries, part of them reflected and the other portions continue penetrating deeper layers. In seismic exploration, it is the reflected seismic waves that are considered as the key signals. Refracted and direct arrival seismic waves may to some degree be considered as signals whereas other types such as ground rolls and air waves are not. In land seismic data acquisitions sensors, such as geophones, are spread on the surface or down hole to receive the reflected waves as signals. The amplitudes of the reflected waves are used to scale the intensities of wave energy.

It is well known that amplitude varies with offset and incident/reflection angle. Seismic waves lose energy due to uncontrolled effects such as far offsets (distance from source), subsurface geology and fluids, and mechanical effects on reflection angles. This energy loss can be minimized through the claimed invention.

Many manufacturers suggest that in normal operation, P-wave geophones will function at an angle of 0-20° from vertical. In practice, under some conditions, P-wave geophones may be able to operate with reasonable accuracy at an angle up to 45° from vertical. To check how a live geophones is planted, a so called "Tilt Test" is run. The Tilt Test correlates known pulse inputs and outputs from a geophone string to a modelled pulse to produce a statistical ratio measuring the amount of deviation from vertical. In static conditions (passive source), extensive measurements were performed to check the effects of tilts on geophones' physical properties such as cutoff frequencies, damping, sensitivities, distortion, etc. These physical properties were observed unaffected when geophones are tiles at 0-30 degrees from vertical and this range can be extended to reach 40 degrees.

It has been found that if a geophone tilted at 40° from vertical and in a direction opposite the incoming signals, this will cause 70% loss in energy (R. Stewart et. al.). If the case is reversed (i.e. if the reflected signal angle is high (but less than critical angle) and the geophone is vertical), then energy losses are expected to be directly proportional to the reflection angles. When a seismic survey is designed, maximum offset is set to image the deepest desired reflector. For example, if the signal reflected at an angle of 45° from the deepest reflector, then geophones located at the maximum offset should be directed toward that angle in order to detect the maximum energy. From field experiments, however, if sensors planted at angles deviated at angles more than 30° but directed towards the reflected signal, it would give similar responses to those, which are planted vertically.

Recording signals reflected at different angles during seismic survey shooting is very difficult and impractical with the current system available in the market. These systems do not provide a way to overcome energy loss due to reflection angles. Consequently, the current systems may not generate a completely accurate seismic signal, which may in turn lead to misinterpreting the information.

SUMMARY OF THE INVENTION

In a preferred embodiment, the external part of the adjustable geophone combines features of spike and flat base geophones and consists of a spike assembled to a rounded flat base. The spike attached from bottom together with the rounded flat base enhances the coupling with the ground and keeps the external part of the geophone in vertical position. The internal parts can be adjusted manually by hand through an angle gage steering system or alternatively, the internal part can be adjusted electronically through an automatic steering device controlled from a recording unit.

The current invention is designed to detect seismic signal reflected by subsurface geological structures in the form of P-waves and S-waves or surface waves, such as ground rolls. The apparatus and method of the current invention efficiently provides improved data that can enhance data processing and interpretation fields at a relatively low cost. AVA (Amplitude Variation with incident Angles) and AVO (Amplitude Variation with Offset) analyses give precise results when data are acquired using the adjustable geophone, which has angle gages allowing flexible adjustment to their internal system angles. Also, the external design allows firm coupling with the ground through the assembled system of both spike and round bases.

In seismic survey design, a model of seismic rays are drawn to create a systematic tracing for both incident and reflected seismic signals penetrating earth subsurface strata. Unlike the conventional geophones now available, the current invention can be pointed towards the reflected signals to minimize the seismic energy losses and to enhance seismic attributes preservation processes.

It is noted that geophones using passive seismic source do not respond accurately when tilted to a 45 degrees. However, during real seismic shooting, a group of geophones tilted at 45 degrees from vertical, respond better than those planted vertically when the source was at an offset from the location of the vertically positioned receivers. This is because, if the receiver is directed towards a incoming signal, it would receive most of its energy The method and apparatus of the current invention reduce or remove misleading mechanical footprints created by seismic data. In theory, reflected signals are affected by a factor known as angle of incident. AVO analyses would yield better results if energy loses due to large angle of incidents were eliminated or minimized. Many studies attempted to eliminate the effects of angle of incident on reflected signals. Instead of addressing the angle of incidence problem after collecting the affected data, this invention addresses the problem at the acquisition stage. Rather than analyzing data that is contaminated with inaccuracies caused by mechanical effects within the geophone, the current invention instead eliminates such mechanical effect.

BRIEF DESCRIPTION OF THE DRAWINGS

So that the manner in which the above-recited features, advantages, and objectives of the invention, as well as others that will become apparent, are attained and can be understood in detail, more particular description of the invention briefly summarized above may be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention may admit to other equally effective embodiments.

DETAILED DESCRIPTION OF THE INVENTION

Figure 1:
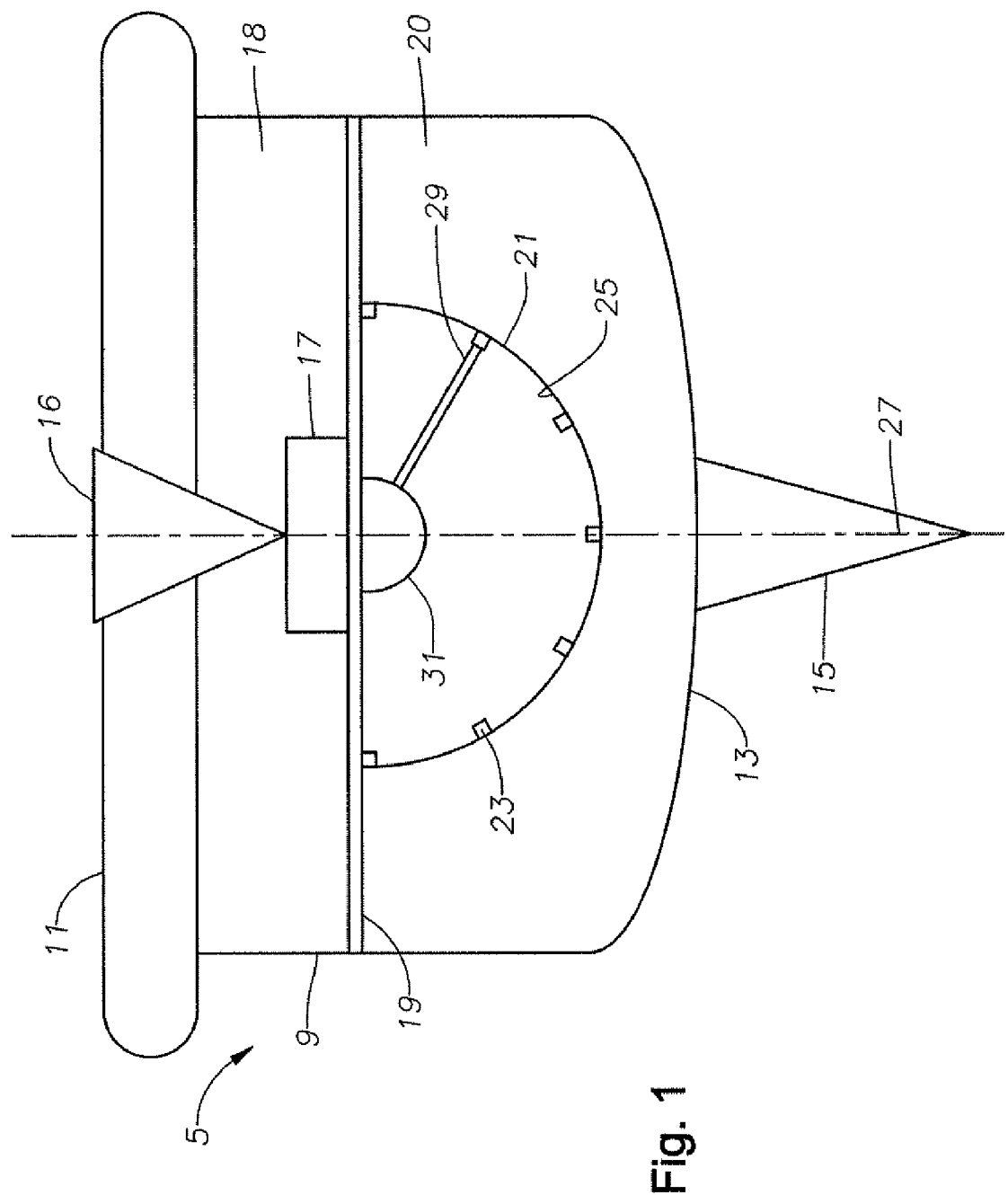
FIG. 1 is an elevational view of embodiment of the geophone of this invention with multiple elements.

As the present invention is disclosed and described, it is to be understood that this invention is not limited to the particular combinations and methods disclosed herein. Accordingly, this disclosure is extended to equivalents of combinations and methods as would be recognized by one of ordinary skill in the arts. It should be understood that terminology employed herein is used for the purpose of describing particular embodiments only and is not intended to be limiting.

The external components of geophone apparatus 5 comprises a housing 9 with a cover 11. In one embodiment, rounded base 13 is attached to the bottom of housing 9 and a spike 15 is fixed to the bottom of the rounded base 13. Using both a rounded base 13 and a spike 15 allow enhance the coupling of the geophone to the ground. Spike 15 helps keep the external part of the geophone in vertical position. In alternative embodiments (not shown), geophone can include a rounded base 13 but not a spike or it can include a spike 15 and no rounded base. Angle gage 16 is placed on top of and connected to steering device 17. Angle gage 16 shows the selection of a direction in three dimensions.

Figure 2:
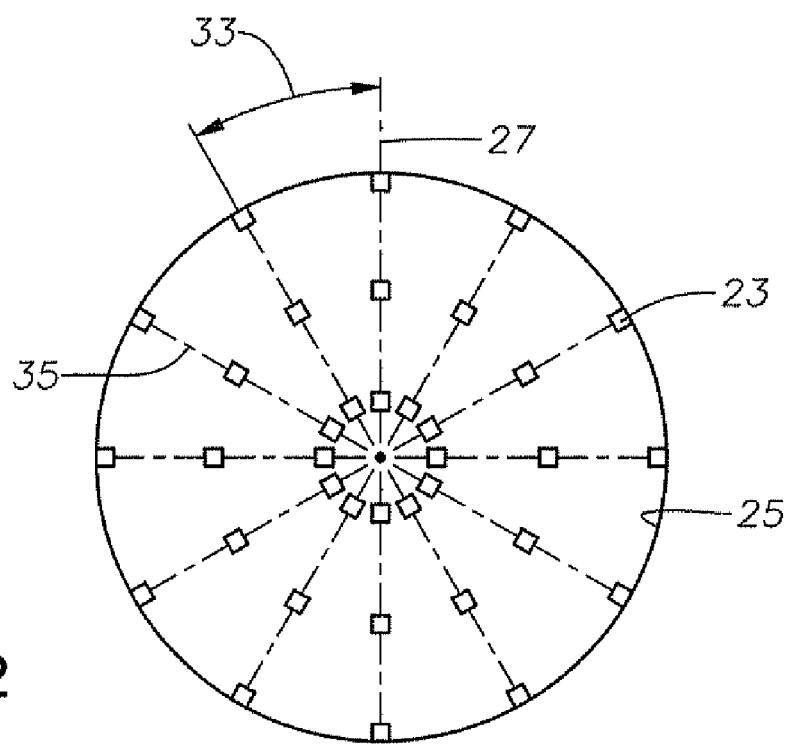
FIG. 2 is a plan view of the lower sphere showing the distributions of bins within the geophone.
Figure 3:
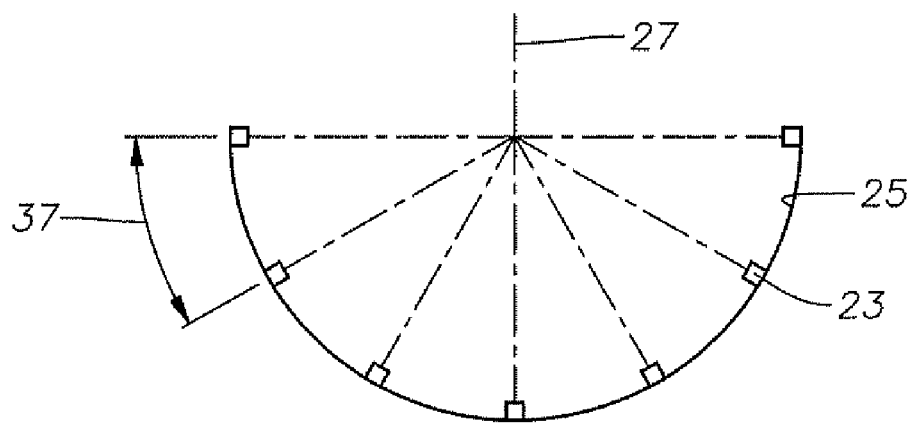
FIG. 3 is an elevational view of the lower sphere showing the distributions of bins within the geophone.

Internally, the geophone consists of two chambers, an upper chamber 18 and a lower chamber 20. The upper chamber 18 contains steering device 17 to direct one or more elements. Insulator object 19 is located below steering device 17. Insulator object 19 separates the two chambers and is made of a sound proof material to eliminate all kinds of surface generated noise in addition to the noise generated in the upper chamber. The lower chamber 20 contains a semi-spherical shaped lower sphere 21 which may be formed of a metallic material. Bins 23 are positioned on inner surface 25 of lower sphere 21. Bins 23 may be spring bins or other standard bins available on the market. Bins 23 are positioned in a regular pattern spaced evenly on the inner surface 25. The spacing or increment of angles between the bins can be selected as desired. For example, if an increment of 30 degrees is desired, angle 33 between section lines 35 would be 30 degrees and 12 section lines 27 would be positioned every 30 degrees around vertical axis 27 of the lower sphere 21 as illustrated in FIG. 2. Bins 23 would be positioned at an increment of every angle 37, which in this case would be 30 degrees, along each section line 35 of inner surface 25 for a total of 3 bins on each line, resulting in a total of 37 bins, including the bin on axis 27.

Geophone element 29 consists of a magnet bar and coil and is located above lower sphere 21. Element 29 is hooked to steering device 17. Steering device 17 is connected to element 29 to point element 29 in the desired direction. Steering device 17 may be connected to element 29 either remotely or they may be wired together. Steering device 17 may be adjusted manually by an angle gage steering system or steering device 17 may be adjusted by an automatic steering system controlled from a recording unit. Angle gage 16 will display the direction at which element 29 is directed. Alternatively, where a ray paths model has been designed and the desired angles are known, in one embodiment more than one element 29 may be fixed at the desired directions and no steering device would be required. The number and positions of elements may be designated to span all desired directions through all movements. In another embodiment, more than one element 29 can be connected to a steering device allowing for free movement of elements to span all desired directions. In practice, this would allow better utilization of time and energy during seismic data acquisition.

Element 29 is suspended within geophone 5 at connection point 31. Connection point 31 allows for the rotation of element 29 within geophone 5.

Those skilled in the art will recognize that many changes and modifications may be made to the process without departing the scope and spirit of the invention. In the drawings and specification, there have been disclosed embodiments of the invention and, although specific terms are employed, they are used in a generic and descriptive sense only and not for the purpose of limitation, the scope of the invention being set forth in the following claims. The invention has been described in considerable detail with specific reference to these illustrated embodiments. It will be apparent, however, that various modifications and changes can be made within the spirit and scope of the invention as described in the foregoing specification.

I claim:

1. A apparatus for sensing seismic waves comprising:
   (a) a housing;
   (b) a base located at the bottom of the housing;
   (c) a lower sphere within the housing having a semi-spherical shape;
   (d) an insulating object located within the housing above the lower sphere;
   (e) a plurality of bins located on an inner surface of the lower sphere;
   (f) at least one geophone element within the lower sphere comprising a magnet and coil, the element having a first end and a second end, and wherein:
   (g) the first end of each geophone element is pivotally connected within the lower sphere to permit movement of the second end of the geophone element in three dimensions;
   (h) the second end of each geophone element is operably connectable to a different one of the plurality of the bins;
   (i) a steering device operably connected to the first end of each element; and
   (j) a three dimensional angle gauge operably connected to the steering device.

2. The apparatus of claim 1, wherein the base comprises a rounded base.

3. The apparatus of claim 2, wherein the base further comprises a spike.

4. The apparatus of claim 1, wherein the steering device comprises a manually operated angle gage steering system.

5. The apparatus of claim 1, wherein the steering device comprises an automatic steering device.

6. The apparatus of claim 1 wherein the bins are spaced at a regular angular circumferential interval on the inner surface relative to a vertical axis of the lower sphere.

7. The apparatus of claim 6 wherein the bins are spaded a regular angular planar interval on the inner surface relative to a horizontal plane located on top of the lower sphere and normal to the vertical axis of the lower sphere.

8. The apparatus of claim 7 wherein the regular angular circumferential interval and the regular angular planar interval are in the range of 5 degrees to 30 degrees.

* * * * *

UNITED STATES PATENT AND TRADEMARK OFFICE
CERTIFICATE OF CORRECTION

PATENT NO. : 7,684,284 B1  Page 1 of 1
APPLICATION NO. : 12/396551
DATED : March 23, 2010
INVENTOR(S) : Al-Jadani et al.

It is certified that error appears in the above-identified patent and that said Letters Patent is hereby corrected as shown below:

Column 4, line 27, delete "A" and replace with "An"

Column 4, line 59, delete "spaded" and replace with "spaced"

Signed and Sealed this

Twenty-second Day of June, 2010

David J. Kappos
*Director of the United States Patent and Trademark Office*